UNITED STATES PATENT OFFICE.

DAVID MOSHER, OF SAN FRANCISCO, CALIFORNIA, ASSIGNOR OF ONE-HALF TO PETER A. WAGNER AND GEORGE A. HINKELBEIN, OF SAME PLACE.

GOLD SOLVENT FOR REFRACTORY ORES.

SPECIFICATION forming part of Letters Patent No. 654,838, dated July 31, 1900.

Application filed April 26, 1900. Serial No. 14,475. (No specimens.)

*To all whom it may concern:*

Be it known that I, DAVID MOSHER, a citizen of the United States, residing in the city and county of San Francisco, State of California, have invented an Improvement in Gold Solvents for Refractory Ores; and I hereby declare the following to be a full, clear, and exact description of the same.

My invention relates to the treatment of base gold ores; and its objects are to reduce the cost and economize the gold solvent to its fullest extent.

The attempt to adopt bromin as a gold solvent in the treatment of refractory ores and regain the bromin from the spent gold solution has not met with any economical success, while a solution of bromin in hydrochloric acid (muriatic acid) offers no advantages, as no attempt is made to also utilize the hydrochloric acid as a gold solvent, which is the aim of this invention. The well-known solubility of bromin in hydrochloric acid (in practice one pound bromin in eight pounds commercial muriatic acid 21° Baumé) has up to the present not been advantageously applied to the treatment of ores, as the muriatic acid has been partially or completely neutralized by means of soda-ash ($Na_2CO_3$) or limestone, ($CaCO_3$,) nullifying the most important factor of the process. I have found that by the addition of any of the alkaline oxygen salts the hydrochloric acid can be fully utilized and is transformed conjointly with the bromin into a most powerful gold solvent. I use by preference potassium permanganate, ($K_2Mn_2O_8$,) which can be obtained at low cost and which answers the purpose most effectively, although equivalents can be adopted instead.

In adopting this process for the leaching of ores I add only a small proportion of the oxygen salt to the hydrochloric solution of bromin, so as to develop no free chlorin in any noxious quantity.

In practice I proceed as follows: In a lead-lined barrel holding about ten tons of crushed and roasted ore I add enough water to produce a semiliquid pulp. A solution of fifteen pounds bromin in one hundred and twenty pounds commercial hydrochloric acid 21° Baumé is then poured in, and finally from ten to fifteen pounds potassium permanganate, ($K_2Mn_2O_8$,) dry and in crystal form, after which the manhole is sealed and the barrel set revolving, as in the well-known chlorination process. About one and one-fourth pounds potential chlorin will be slowly generated for each pound potassium permanganate ($K_2Mn_2O_8$) used, as it is slowly dissolved in the solution. Sufficient pressure will also be induced in the barrel and the gold rapidly and completely dissolved, while the solvent capacity of the solution will with little additional cost be more than doubled.

For well-roasted and slightly-base ores the above quantity of chemicals may be materially reduced. The precipitation is best effected by sulfurous acid and hydrogen sulfid, which is the method preferably in use for precipitating precious metals out of halogen solutions and needs no description.

I have not deemed it necessary to enter into the mechanical details of the process, the Colorado chlorination plants using roasting-furnaces and lead-lined revolving barrels being well suited to my purpose.

I do not claim the solution of bromin in hydrochloric acid; but

What I desire to secure by Letters Patent is—

1. The process of treating refractory ores containing gold, consisting in reducing the ore to a pulp, adding thereto a solution of bromin in hydrochloric acid and then adding an oxygen salt of an alkali metal capable of reacting on hydrochloric acid to evolve free chlorin to transform the hydrochloric acid conjointly with the bromin into strong gold solvent.

2. The process of treating refractory ores consisting in reducing the ore to a pulp, adding thereto a solution of bromin in hydrochloric acid, then adding potassium permanganate and thereby liberating chlorin from the hydrochloric acid to transform the acid and bromin into a more effective solvent.

3. The process of treating refractory ores consisting in reducing the ore to a pulp, adding thereto a solution of about fifteen pounds of bromin in one hundred and twenty pounds of commercial hydrochloric acid 21° Baumé, then adding potassium permanganate in dry and crystal form to slowly generate chlorin.

4. The process of treating refractory ores consisting in reducing the ore to a pulp; adding thereto a solution of bromin in hydrochloric acid; then adding an oxygen salt of an alkali metal capable of reacting on hydrochloric acid to evolve free chlorin; then agitating the mass to slowly liberate chlorin, and then precipitating the precious metals.

In witness whereof I have hereunto set my hand.

DAVID MOSHER.

Witnesses:
S. H. NOURSE,
JESSIE C. BRODIE.